United States Patent

Nyland

[11] Patent Number: 5,511,040
[45] Date of Patent: Apr. 23, 1996

[54] METHOD FOR CALCULATING THE OPTIMUM VIBRATOR SPACING FOR GROUND ROLL REDUCTION

[75] Inventor: David Nyland, Houston, Ak.

[73] Assignee: Western Atlas Internaitonal, Inc., Houston, Tex.

[21] Appl. No.: 384,778

[22] Filed: Feb. 6, 1995

[51] Int. Cl.⁶ .............................. G01V 1/143; G01V 1/28
[52] U.S. Cl. .............................. 367/56; 367/40; 364/421
[58] Field of Search .............................. 367/40, 56, 189; 181/108, 111; 364/421

[56] References Cited

U.S. PATENT DOCUMENTS

| | | | |
|---|---|---|---|
| 3,277,977 | 10/1966 | Siberman | 367/56 |
| 3,479,638 | 11/1969 | Rusnah | 367/56 |
| 4,403,312 | 9/1983 | Thomason | 367/40 |
| 4,758,998 | 7/1988 | Johnson et al. | 367/56 |

OTHER PUBLICATIONS

Sallas, J. J.; 57 Oh Annu Soc. Explor. Geophys. Int. Ortg., Oct. 11, 1987, pp. 236–238, ISBN 0-931830-52-4.
Anstiy, N. A..; Leading Edge, vol. 5, #3, pp. 40–51 Mar. 1986.

*Primary Examiner*—Nelson Moskowitz
*Attorney, Agent, or Firm*—William A. Knox

[57] ABSTRACT

A method for increasing the signal-to-coherent-noise ratio of seismic signals propagating along multi-azimuthal trajectories by abating Rayleigh wave contamination. A plurality of seismic receivers surround a nest of vibrators separated by a first uniform incremental spacing whereupon the vibrators emit chirp signals. The chirp signals are received by the seismic sensors, the received signals are stacked, auto-correlated, integrated and the integrated signal level is tabulated as a function of vibrator separation. The first vibrator separation is repeatedly uniformly expanded by a selected increment and the steps of emitting, receiving, stacking, auto-correlating and tabulating are repeated after each incremental separation. The separation corresponding to the minimal integrated signal level is selected.

9 Claims, 4 Drawing Sheets

METHOD FOR CALCULATING THE OPTIMUM VIBRATOR SPACING FOR GROUND ROLL REDUCTION

FIELD OF THE INVENTION

This invention is concerned with reduction of ground roll by optimally spacing the individual vibrators of a vibrator array used in the conduct of seismic exploration.

DISCUSSION OF RELATED ART

In seismic exploration, an acoustic source insonifies the subsurface earth layers. The acoustic energy impinging upon the earth layers is reflected therefrom whence the reflected energy is returned to the surface where it is detected by seismic sensors of any well-known type as a set of analog signals. The detected signals are discretized and processed to display a model of a cross section of the earth. The returning reflected signals comprise a complex wavefield that includes compressional waves, shear waves, Love waves, ground roll, of which the most useful wave type are compressional waves.

Ground roll is a very low-frequency seismic surface wave or Rayleigh wave that is generated by a seismic acoustic source in certain types of terrain. The frequency content may range from about 3 Hz or less to as much as 25–30 Hz. The propagation velocity of Rayleigh waves is about half that of compressional waves although the velocity may be as low as 900 feet per second. The energy distribution in a wavefield generated by a selected radiating source in one area has been reported to include 6.9% assigned to compressional waves, 25.7% to shear waves and 67.4% to Rayleigh waves. Since it is the compressional wavefield that is usually sought for use in geophysical exploration, the Rayleigh waves are wasted energy. As a matter of interest, Rayleigh waves are responsible for much of the structural damage caused by earthquakes, particularly in loose, moist soils.

Because of their slow propagation velocity and very high amplitude, Rayleigh waves mask desired compressional-wave energy originating from shallow earth layers. The low-frequency components of the Rayleigh wavefield can be removed from the recorded data signals by electrical filtering but that is not possible for Rayleigh components comparable in frequency to the desired compressional wave energy. Furthermore, because of their great energy, such wavefields can saturate the electronic recording equipment. It is preferable to avoid generating, or to eliminate that very troublesome type of coherent noise ab initio.

Various stratagems have been devised to handle the problem. Traditionally, it has been the practice to employ spatial filtering wherein the seismic signal receivers, the seismic sources or both are spaced such that waveforms within a specified range of wavelengths are destructively canceled by signal summation. The spacing may be determined empirically using so-called walk-away wave tests. That method is satisfactory for linear arrays associated with wavefield trajectories directed along a limited azimuthal band width but the method is not very useful for 3-D omni-directional operations. Other methods involve velocity filtering during data post-processing which may be helpful against the higher-frequency Rayleigh waves.

U.S. Pat. No. 4,723,231 issued Feb. 2, 1988 and U.S. Pat. No. 4,918,668 issued Apr. 17, 1990, both issued in the name of John Sallas, disclose a method for minimizing ground roll by adjusting the amplitude as a function of the frequency of the output signals of a plurality of vibratory sources. The arrangement is intended to minimize the Rayleigh-wave output in given directions of the source array having given spacings between sources in the far field. The Rayleigh waves from the respective sources tend to cancel each other. The objection to Sallas' method is the massive amount of calculation needed to properly weight the energy level of the respective discrete frequencies that make up the chirp signal typically emitted by a seismic vibrator. Because of the calculation effort, the method is not very practical for field use.

In a paper entitled On the Relative Partition of Energy Between Elastic Waves in a Semi-infinite Solid, published by G. F. Miller and H. Pursey in the Proceedings of the Royal Society, 1955, pp. 55–69, the authors showed that the relative energy output of Rayleigh waves and compressional waves is a function of vibrator spacing. For omni-directional arrays, it is preferable that the sources be equally spaced from one another. Thus, for three vibrator sources, an equilaterally triangular array is preferable. Miller and Pursey based their analysis on theoretical considerations involving the elastic constants of a semi-infinite solid, quantities that cannot be easily measured in the field. For that reason, using only their teachings, the critical spacing of the sources of an array cannot readily be tailored in the field to match particular terrain characteristics.

Of the total energy contained by a composite wavefield, most of the energy by far is contained in the Rayleigh waves as was explained earlier. It is reasonable to assume, and as shown by Miller and Pursey, that the maximum signal-to-coherent-noise-ratio is achieved when the total energy is a minimum even though the absolute energy level of the compressional waves themselves may not be maximized.

There is a need for a real-time method for empirically optimizing the spacing of an array of sources that will maximize the signal-to-coherent-noise ratio with respect to a particular terrain over which operations are being conducted. This invention will be explained in terms of seismic vibratory source but it should be understood that the method can be applied to any desired type of seismic source.

SUMMARY OF THE INVENTION

An array of symmetrically-disposed seismic vibrators, spaced from one another by a first spatial separation, is established at a desired location. The array forms the center of a quadrant of a circular arc. A plurality of seismic receivers are distributed at selected spaced-apart intervals around the arc, the radius of the arc being such as to place the receivers in the far field. The vibrators emit a chirp signal of a desired length a plurality of times. The plurality of chirp signals as heard by each of the receivers are stacked and autocorrelated. The zero-lag values of the respective auto-correlation functions are integrated and the energy level of the integrated auto-correlations is tabulated as a function of the first spatial separation.

The vibrators are symmetrically moved outwardly apart by a second and by subsequent desired incremental spatial separations and the steps of emitting a plurality of chirp signals, stacking the chirp signals, auto-correlating the stacked chirp signals, integrating the zero-lag auto-correlations and tabulating the energy level of the integrated auto-correlations are repeated for each incremental spatial separation. The spatial separation corresponding to the minimum value of the integrated zero-lag auto-correlation function maximizes the signal-to-coherent-noise ratio by abating ground roll contamination.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

As was earlier explained, Miller and Pursey calculated the theoretical output power of the several elements of an array of vibrators located at the surface of a homogeneous half space, namely the earth's surface. The total output power is a function of Poisson's ratio and the various stress components of the surface rocks. The mathematical description of the output power maybe represented as a summation of zero-order Bessel functions whose argument is proportionasl to kb, that is, the product of the wave number k with a particular vibrator separation b. The formulation has a minimum associated with some particular separation. At the minimum value, the Rayleigh-wave power (the ground roll) is at a minimum.

Present-day technology does not permit determination of the various elastic constants for use in field-determination of optimal vibrator spacing in near real time. I have found that the output-power minimum can be determined from the vertical component of a received seismic wavefield alone without recourse to Poisson's ratio or other elastic constants by making use of the wavefield zero-phase auto-correlation function. The method to be disclosed is suitable for empirical use in the field so that the exploration crew can readily adapt the vibrator configuration to conform to changing field conditions. This method will be described in terms of seismic vibrators although[it could be used with other types of sources given suitable modifications.

Figure 1:
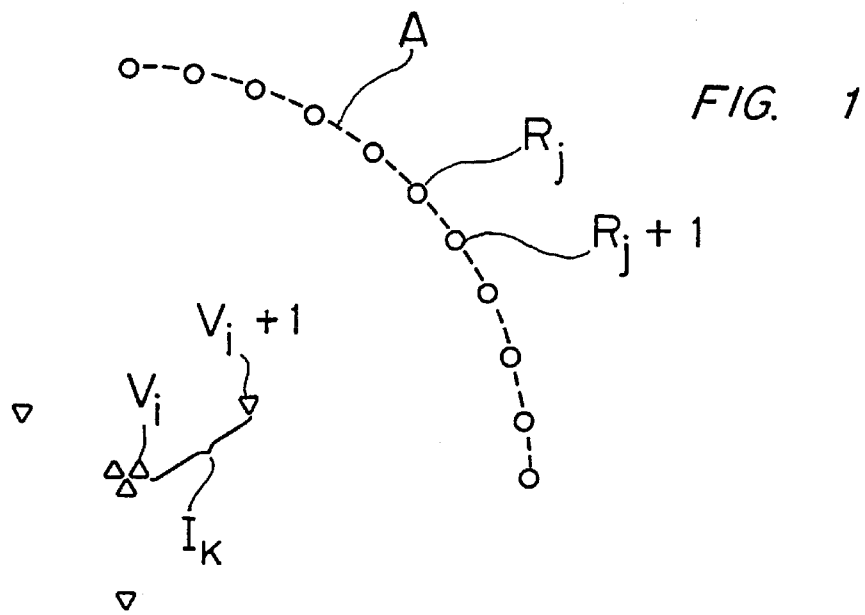
FIG. 1 illustrates the vibrator and receiver configuration useful for empirically optimizing the vibrator spacing.

In FIG. 1, an array of vibrator positions $V_i$, indicated by small triangles, is established over the surface of the earth in a region of interest. The vibrators initially should be as close together as possible, approaching zero separation.

It is desired to design an areal vibrator array that will be effective over omni-azimuthal wavefield trajectories as encountered in 3-D operations. Using the middle of the vibrator array as a center, a circular arc A is circumscribed. A plurality of seismic receivers such as $R_j$, which may be geophones, are emplaced at intervals around the arc. As here used, the term "receiver" may include a single instrument or each receiver emplacement may consist of a plurality of individual units electrically interconnected and closely bunched together to simulate a point receiver. The receivers may be spaced-apart about 110 feet or any other preferred spacing may be used. Assuming that the near-surface materials encountered in the area of interest are geologically uniform, the receivers may be confined to a single quadrant to conserve experimental field time. The radius of the arc should place the receivers in the far field or about twice the wavelength of the local compressional waves. A radius of 1000 to 2000 feet is adequate.

Figure 4:
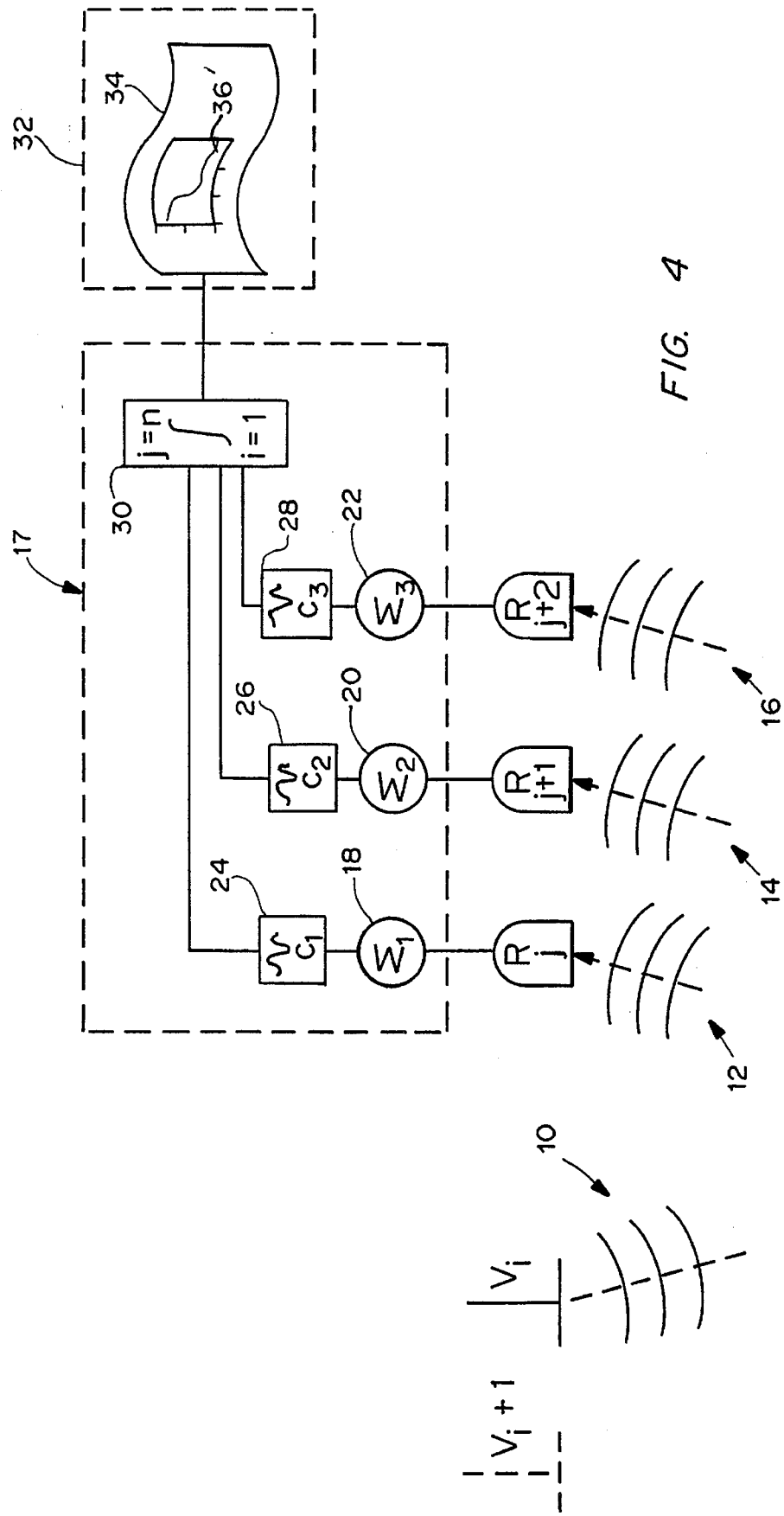
FIG. 4 is a schematic diagram of the data-processing flow.

FIG. 4 is a schematic diagram to illustrate the presently preferred method of operation. One or more vibrators such as $V_i$ are caused to emit a chirp signal 10 of a preferred duration (execute a sweep) several times using a desired frequency band. At least four emissions per setup are preferable. The listening time at the receivers such as $R_j$, $R_{j+1}$, $R_{1+2}$ should be long enough, perhaps 2 to 3 seconds, to receive the slow-moving Rayleigh waves. The respective chirp-signal emissions 12, 14, 16 as received by each seismic receiver such as $R_j$ are discretized and stacked in summing registers 18, 20, 22 which may be a part of a programmed computer 17 or may be an external unit. The computer 17 is of any well-known type that is customarily mounted in a field-deployed instrumention vehicle. The stacked chirp signals are each autocorrelated as $C_1$, $C_2$, $C_3$, in computer 17 as shown symbolically by steps 24, 26 and 28. The zero-lag auto-correlation functions are integrated over the interval j=1 to j=n using a suitable program in computer 17 as shown symbolically at 30. The energy level of the integrated auto-correlation function is quantitatively normalized and tabulated as a function of vibrator separation, which for the initial set-up $V_i$ is substantially zero.

Figure 2:
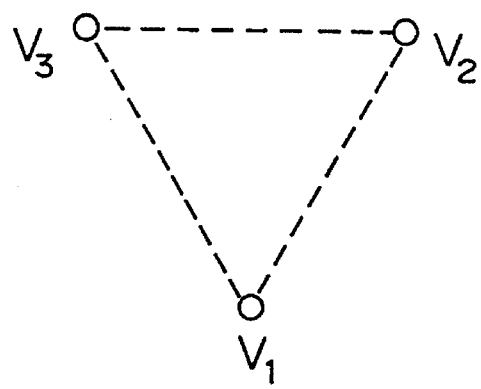
FIG. 2 illustrates a preferred triangular vibrator array.
Figure 3:
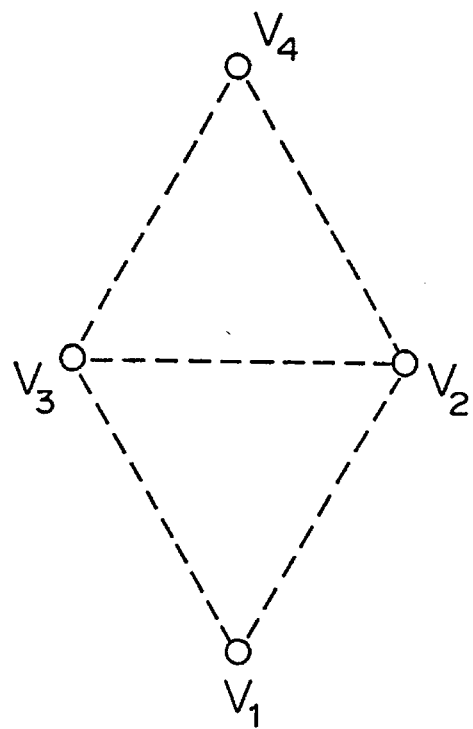
FIG. 3 represents a preferred diamond array.

The vibrator positions are next repeatedly expanded symmetrically outwards about a common center, always keeping the vibrator positions equidistant from each other such as shown in FIG. 1 and suggested at $V_{1+1}$ (dashed lines) of FIG. 4. Each incremental separation interval $I_k$ may be on the order of ten to twenty feet. In a preferred configuration, the vibrators are equidistant from each other, using an equilaterally triangular pattern if three vibrators are used as shown in FIG. 2. For four vibrators, a diamond pattern is preferred which is constructed from two equilateral triangles having a common base as shown in FIG. 3.

The steps of emitting a chirp signal, receiving and recording the chirp signal, stacking, auto-correlating, integrating and tabulating the auto,correlation functions are repeated for each incremental separation. The maximal experimental separation needed is on the order of about 200 feet in most cases.

After each incremental separation and the calculation steps have been completed, the relative amplitude or energy level of the integrated zero-phase autocorrelation functions are tabulated with respect to incremental separation. Any well-known computer graphics program may be used such as AutoCAD as provided by Autodesk in Combination with a graphics plotter such as 32 to provide hard-copy output 34 including a graph 36' of relative energy level with respect to vibrator separation as will now be explained with the aid of FIGS. 5 and 6.

Figure 5:
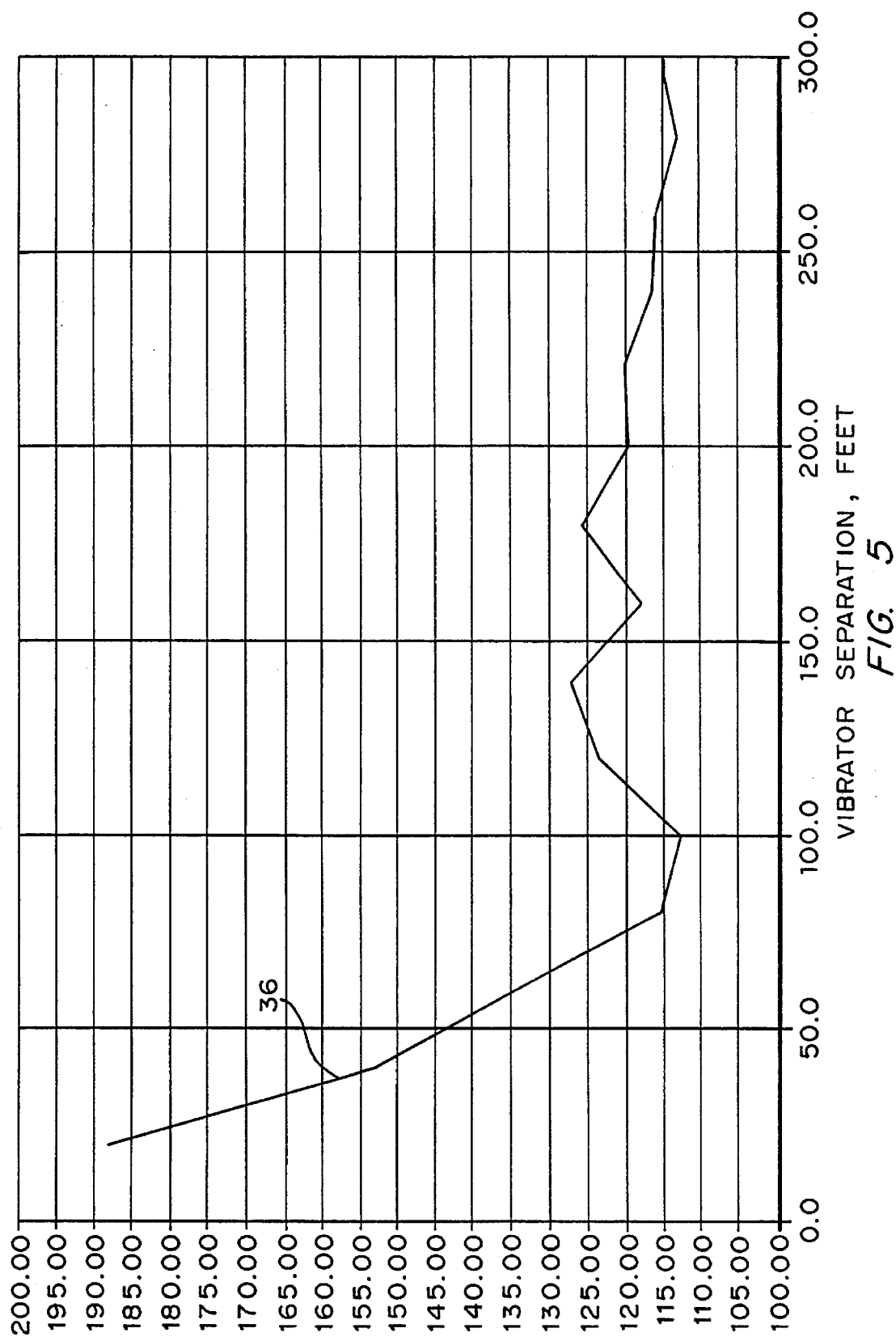
FIG. 5 is a tabulation of the relative amplitude of the zero-phase, integrated autocorrelation function with respect to vibrator separation for a 4-second chirp signal.

FIG. 5 is a field example of the relative amplitude of the integrated normalized auto-correlation function as tabulated with respect to vibrator separation. The output power curve 36, as represented by the relative amplitudes, diminishes with increasing vibrator separation, reaching a minimum at about 100 feet using a 4-second chirp signal in the 8–50 Hz band. Beyond 100 feet, the energy is substantially constant.

Figure 6:
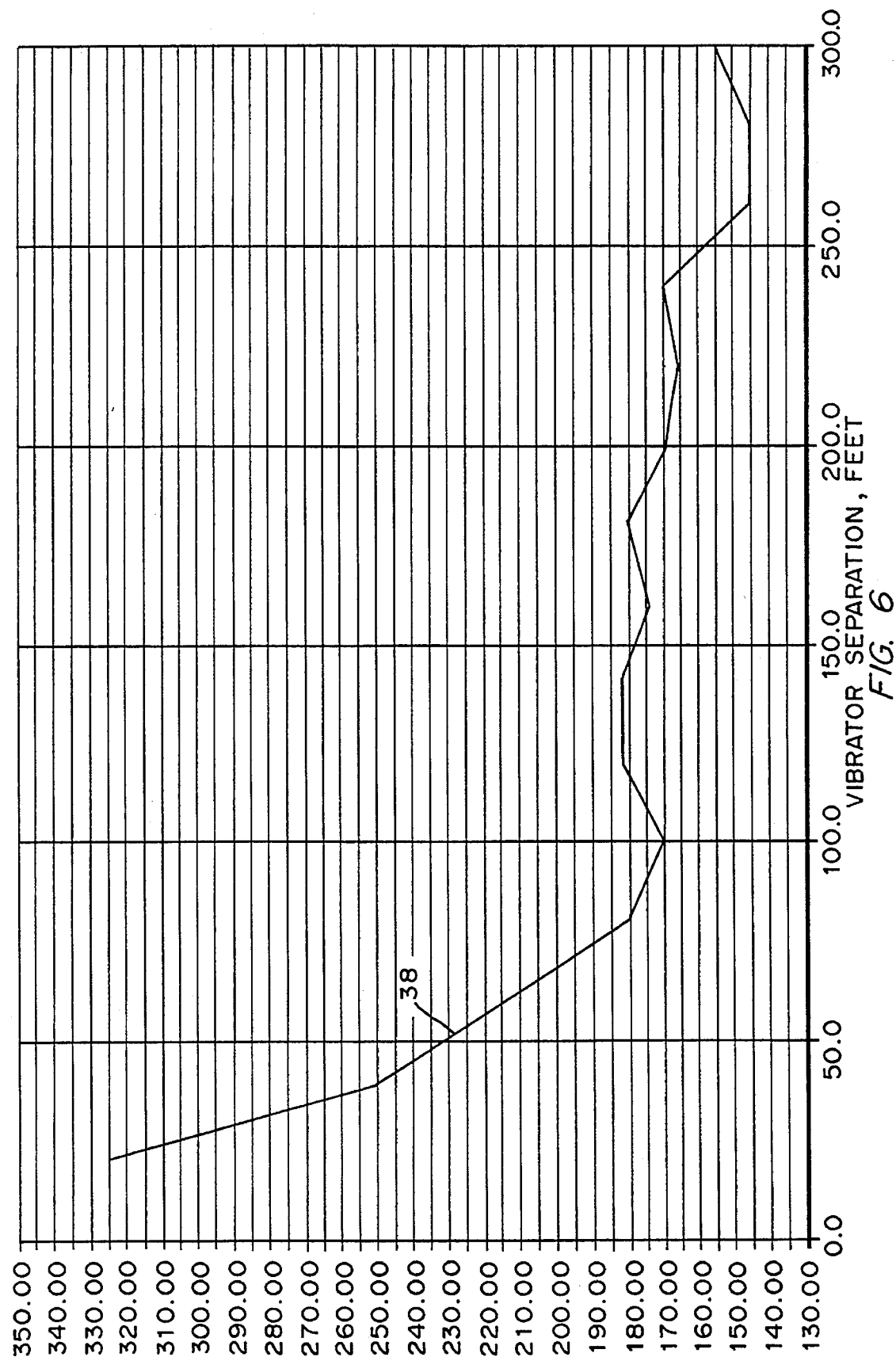
FIG. 6 is a tabulation similar to that of FIG. 4 for an 8-second chirp signal.

FIG. 6 is another field example of a power output curve 38 but using an 8-second signal. In these tests, the radius of the receiver arc was about 1430 feet. In both cases, the optimum vibrator separation for abating ground roll contamination is about 100 feet. In the above tests, four vibrators were used in a diamond pattern. Twenty-three receivers separated by 110 feet were used to record the data for a 12-second listening time. The tabulations as shown in FIGS. 5 and 6 may be prepared by any well-known computer-aided graphics program as explained earlier In field tests of this nature, several vibrators may be used to vibrate concurrently or a single vibrator may be used which sequentially visits the respective vibrator positions, emitting a chirp signal at each location. The results will be equivalent.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A method for determining the optimal vibrator separation for improving the seismic signal-to-coherent-noise ratio by abating ground roll contamination, comprising:
   a. establishing a seismic source array including a plurality of discrete vibrator positions symmetrically spaced-apart by a first separation;
   b. distributing a plurality of seismic signal receivers at selected intervals around a quadrant of an arc centered by the array;
   c. emitting a plurality of identical chirp signals from the respective vibrator positions of said array;
   d. at each of said receivers, receiving the plurality of emitted chirp signals, stacking the plurality of received chirp signals and auto-correlating the stacked chirp signals;
   e. integrating the auto-correlated signals from all of the receivers, quantifying the level of the integrated auto-correlated signals and tabulating the quantified value of said level as a function of vibrator-position separation;
   f. symmetrically expanding the first separation between the seismic vibrator positions of the array by a selected increment a plurality of times and repeating steps b through e after each incremental expansion; and
   g. maximizing ground roll abatement by selecting a vibrator-position separation corresponding to the minimum tabulated signal level of the integrated auto-correlation function.

2. The method as defined by claim 1, wherein:

said array includes three vibrator positions having a symmetrical distribution in the form of an equilateral triangle, a vibrator being disposed at each said position.

3. The method as defined by claim 1, wherein:

said array includes four vibrator positions having a symmetrical distribution in the form of a diamond constructed from two equilateral triangles having a common base, a vibrator being disposed at each position.

4. The method as defined by claim 1, wherein:

said array is simulated by a single vibrator that sequentially visits each said position.

5. The method as defined by claim 1, wherein:

said first separation approaches a substantially zero separation.

6. The method as defined by claim 1, wherein:

the radius of the circular-arc quadrant is such that the seismic receivers reside in the far field.

7. The method as defined by claim 1, wherein:

the radius of the circular-arc quadrant is at least twice the wavelength of compressional waves radiated by a vibrator positioned in said array.

8. The method as defined by claim 1, wherein:

step e includes the step of integrating the zero-lag auto-correlation functions of said stacked chirp signals.

9. The method as defined by claim 1, wherein:

said vibrator positions in said spatial array are mutually equidistant from each other.

* * * * *